(12) United States Patent
Karaki

(10) Patent No.: US 7,362,501 B2
(45) Date of Patent: Apr. 22, 2008

(54) MICROSCOPE APPARATUS

(75) Inventor: Kenji Karaki, Ina (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/266,405

(22) Filed: Nov. 4, 2005

(65) Prior Publication Data

US 2006/0103921 A1 May 18, 2006

(30) Foreign Application Priority Data

Nov. 15, 2004 (JP) ............................ 2004-330955

(51) Int. Cl.
*G02B 21/00* (2006.01)
*G02B 21/02* (2006.01)

(52) U.S. Cl. ...................... 359/379; 359/368; 359/661; 359/819

(58) Field of Classification Search ........ 359/368–390, 359/656–661, 800–823
See application file for complete search history.

(56) References Cited

U.S. PATENT DOCUMENTS

| 775,934 | A | | 12/1904 | Patterson |
|---|---|---|---|---|
| 2,437,775 | A | * | 3/1948 | Williams ..................... 356/632 |
| 2,533,371 | A | * | 12/1950 | Heine .......................... 359/660 |
| 2,696,755 | A | | 12/1954 | Frischmann |
| 2,764,061 | A | * | 9/1956 | Kinder et al. ................ 359/661 |
| 4,025,171 | A | * | 5/1977 | Peck ............................ 359/823 |
| 4,190,313 | A | | 2/1980 | Schultz |
| 4,208,089 | A | * | 6/1980 | Netto .......................... 359/363 |
| 4,687,913 | A | * | 8/1987 | Chaban ..................... 250/201.3 |
| 4,779,967 | A | * | 10/1988 | Murphy et al. ............. 359/379 |
| 5,497,267 | A | * | 3/1996 | Ishikawa et al. ............ 359/390 |
| 5,535,052 | A | * | 7/1996 | Jorgens ....................... 359/388 |
| 6,023,381 | A | * | 2/2000 | Bender ....................... 359/823 |
| 6,266,183 | B1 | | 7/2001 | Guenther et al. |
| 6,404,546 | B2 | * | 6/2002 | Toyoda et al. .............. 359/392 |
| 6,909,540 | B2 | * | 6/2005 | Engelhardt et al. ......... 359/379 |
| 2002/0015223 | A1 | | 2/2002 | Mecham et al. |
| 2003/0081310 | A1 | | 5/2003 | McManus et al. |

FOREIGN PATENT DOCUMENTS

| GB | 1 181 976 | | 2/1970 | |
|---|---|---|---|---|
| JP | 2-123310 | * | 5/1990 | ................. 359/383 |
| JP | 11-167066 A | | 6/1999 | |

* cited by examiner

*Primary Examiner*—Thong Q Nguyen
(74) *Attorney, Agent, or Firm*—Kenyon & Kenyon LLP

(57) ABSTRACT

An objective lens can be reduced in diameter, which allows examination inside a specimen such as a living organism with minimum invasiveness and also reduces costs. The invention provides a microscope apparatus including an objective-lens mounting part for removably mounting an objective lens unit; an apparatus main body for supporting the objective-lens mounting part so as to be movable in the optical axis direction; and an urging mechanism, disposed between the apparatus main body and the objective-lens mounting part, for urging the objective-lens mounting part towards the tip of the objective lens unit relative to the apparatus main body.

7 Claims, 9 Drawing Sheets

MICROSCOPE APPARATUS

BACKGROUND OF THE INVENTION

1. Field of the Invention

The present invention relates to a microscope apparatus.

This application is based on Japanese Patent Application No. 2004-330955, the content of which is incorporated herein by reference.

2. Description of Related Art

A known microscope apparatus in the conventional art is the device disclosed, for example, in Japanese Unexamined Patent Application Publication No. HEI-11-167066.

This microscope apparatus includes an objective lens having a spring-type shock-absorbing mechanism. When the tip of the objective lens is pressed by an external force, the spring-type shock-absorbing mechanism is designed to displace the tip of the objective lens in compliance with the external force. Employing such a spring-type shock-absorbing mechanism provides an advantage in that, when using an objective lens with a short working distance (WD) and the objective lens is disposed above a slide glass to examine a specimen covered with a cover glass, even if the tip of the objective lens accidentally makes contact with the cover glass, damage to the cover glass or the specimen can be avoided.

However, in the microscope apparatus disclosed in the above-cited Japanese Unexamined Patent Application Publication No. HEI-11-167066, at least one of the components of the optical system provided inside the outer barrel of the objective lens is movable in the optical axis direction with respect to the outer barrel. Therefore, if a spring-type shock-absorbing mechanism for urging the internal optical system towards the tip is also provided, the outer diameter of the entire objective lens, including the outer barrel, becomes large.

In the examination technique described in the above cited Japanese Unexamined Patent Application Publication No. HEI-11-167066, the objective lens is initially disposed outside the specimen or only the tip of the objective lens is placed in contact with the specimen. Therefore, even though the outer diameter of the entire objective lens is large, there is no problem. However, when carrying out in-vivo examination inside a living organism, such as a small laboratory animal like a mouse, it is necessary to insert the tip of the objective lens into the living organism. In such a case, if the outer diameter of the objective lens is large, it is necessary to make a large incision in the living organism, which places an excessively large strain on the living organism. Therefore, there is a drawback in that it is difficult to safely carry out in-vivo examination for an extended period of time.

Furthermore, as disclosed in the above-cited Japanese Unexamined Patent Application Publication No. HEI-11-167066, if a spring-type shock-absorbing mechanism is provided in the objective lens, when the objective lens is to be changed for another one with a different magnification, it is necessary to provide spring-type shock-absorbing mechanisms in all objective lenses, resulting in the problem of high cost.

Moreover, when a spring-type shock-absorbing mechanism is provided in the objective lens, the moving parts must have a waterproof construction, resulting in the problems of a more complex structure, larger diameter, and higher cost.

BRIEF SUMMARY OF THE INVENTION

The present invention has been conceived in light of the circumstances described above, and an object thereof is to provide a microscope apparatus having an objective lens of reduced diameter to enable examination of the interior of a specimen such as a living organism with minimum invasiveness and also to reduce the cost thereof.

In order to achieve the object described above, the present invention provides the following solutions.

The present invention provides a microscope apparatus including an objective-lens mounting part for detachably mounting an objective lens unit; an apparatus main body for supporting the objective-lens mounting part so as to be movable in an optical axis direction; and an urging mechanism, provided between the apparatus main body and the objective-lens mounting part, for urging the objective-lens mounting part towards a tip of the objective lens unit relative to the apparatus main body.

According to the present invention, when carrying out examination of a specimen with the objective lens unit mounted to the objective-lens mounting part, if the tip of the objective lens unit makes contact with the specimen and an external force received from the specimen is exerted on the urging mechanism, the objective lens unit is pushed back towards the apparatus main body with the objective-lens mounting part. Therefore, it is possible to prevent an excessive force being exerted on the objective lens unit and the specimen to avoid damaging the objective lens unit or the specimen.

In this case, in the present invention, since the urging mechanism is provided between the apparatus main body and the objective-lens mounting part for attaching the objective lens unit so that they can move relative to each other, instead of in the objective lens unit, the outer diameter of objective lens unit can be reduced to the minimum. Therefore, when examining the interior of a specimen such as a living organism, the size of the region to be incised can be kept to the utmost minimum, which reduces the stress placed on the specimen and allows the viability of the specimen to be maintained for an extended period of time.

Furthermore, in contrast to the conventional technique of providing a spring-type shock-absorbing mechanism in each objective lens unit, in the present invention, a single shock-absorbing mechanism can be shared among multiple objective lens units, which enables the cost of the apparatus to be reduced. Also, since moving parts for the shock-absorbing mechanism are not provided in the objective lens unit, the construction of the objective lens unit can be more easily made waterproof. Therefore, it is possible to provide a microscope apparatus that is suitable for in-vivo examination applications where the tip of the objective lens unit is inserted into a living organism.

The invention described above may further include an imaging lens, provided in the objective-lens mounting part in the apparatus main body, for collimating light from a light source.

Furthermore, the invention described above may further include a rotation locking mechanism for preventing relative rotation between the apparatus main body and the objective-lens mounting part in a circumferential direction.

Furthermore, the invention described above may further include a locking member that is removably fixed to one of the apparatus main body and the objective-lens mounting part, wherein, when fixed to one of the apparatus main body and the objective-lens mounting part, the locking member abuts against the other one of the apparatus main body and the objective-lens mounting part to prevent relative displacement of the objective-lens mounting part with respect to the apparatus main body in the optical axis direction.

Furthermore, the invention described above may further include a sensor for detecting relative displacement of the objective-lens mounting part with respect to the apparatus main body in the optical axis direction.

In the invention described above, the sensor preferably detects relative displacement at or above a predetermined value.

In the invention described above, the apparatus main body may include a first cylinder disposed along the optical axis; the objective-lens mounting part may include a second cylinder that engages with the first cylinder so as to be capable of moving in the optical axis direction; and, of the first cylinder and the second cylinder, the cylinder disposed at the inside may be provided with a relative displacement indicator which is exposed from below the cylinder provided at the outside when relative displacement of these cylinders occurs in the optical axis direction.

According to the present invention, since a shock-absorbing mechanism is formed by providing an urging mechanism between the apparatus main body and the objective-lens mounting part for attaching the objective lens unit, it is possible to reduce the outer diameter of the objective lens unit to the minimum possible size. Therefore, when examining the interior of a specimen such as a living organism, the size of a region to be incised can be minimized, which reduces the stress placed on the specimen and provides the advantage that examination can be continuously carried out for an extended period of time while maintaining the viability of the specimen.

Furthermore, in contrast to the conventional technique of providing a spring-type shock-absorbing mechanism in each objective lens unit, in the present invention, a single shock absorbing mechanism can be shared between all objective lens units, which enables the cost of the apparatus to be reduced. Also, since moving parts for the shock-absorbing mechanism are not provided in the objective lens unit, the construction of the objective lens unit can more easily be made waterproof. Therefore, it is possible to provide a microscope apparatus that is suitable for in-vivo examination applications where the tip of the objective lens unit is inserted into a living organism.

BRIEF DESCRIPTION OF THE DRAWINGS

FIG. 3 is a longitudinal sectional view showing a state in which an objective lens unit in the microscope apparatus in FIG. 1 is pushed in.

DETAILED DESCRIPTION OF THE INVENTION

A microscope apparatus 1 according to a first embodiment of the present invention will be described below with reference to FIGS. 1 to 8.

The microscope apparatus 1 according to the present embodiment is suitable for examining the interior of a specimen which is a living organism, for example, a small laboratory animal such as a mouse.

Figure 1:
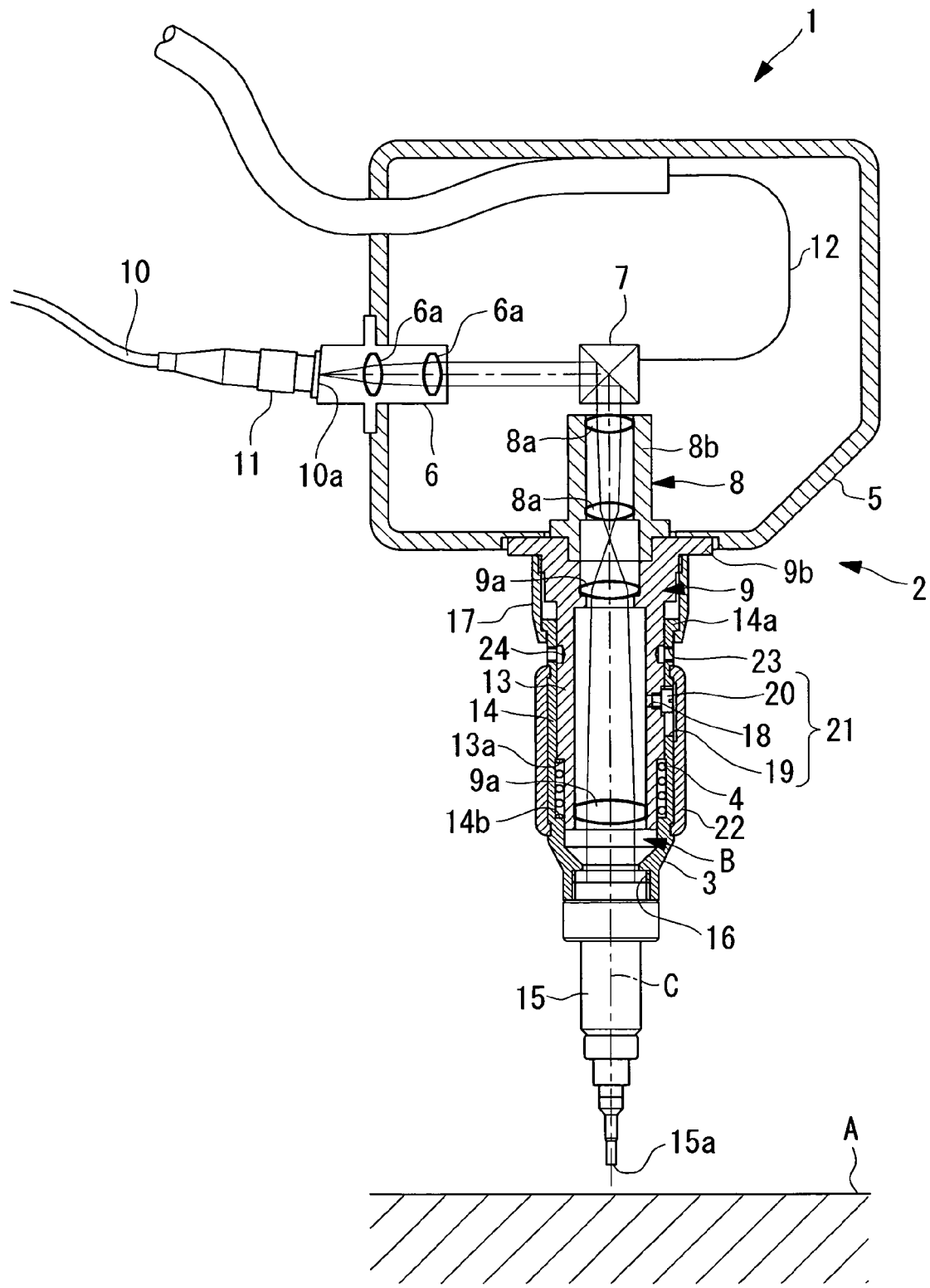
FIG. 1 is a longitudinal sectional view showing a microscope apparatus according to an embodiment of the present invention.

As shown in FIG. 1, the microscope apparatus 1 according to the present embodiment includes an apparatus main body 2, an objective-lens mounting part 3 provided so as to be movable towards the apparatus main body 2 in the direction of an optical axis C, and an urging mechanism 4 disposed between the apparatus main body 2 and the objective-lens mounting part 3.

The apparatus main body 2 includes a main body case 5, a collimator unit 6 that is fixed to the main body case 5, an optical scanning unit 7 for two-dimensionally scanning the light collimated by the collimator unit 6, a pupil projection lens unit 8 for focusing the light scanned by the optical scanning unit 7 to form an intermediate image, and an imaging lens unit 9 that converges the light forming the intermediate image to convert it to a collimated beam.

The end of an optical fiber 10 for guiding light from a light source (not shown) is fixed to the collimator unit 6 by means of a connector 11. The connector 11 is fixed to the collimator unit 6 so as to form a slight angle with respect to the optical axis. By doing so, the light exit surface 10*a* of the optical fiber 10 forms an angle with respect to the longitudinal direction, and light reflected inside the optical fiber 10 at the light exit surface 10*a* can be prevented from returning to an optical detector (not shown) provided at the light source side. Light emitted from the light exit surface 10*a* of the optical fiber 10 is converged and converted to a collimated beam upon passing through lenses 6*a* in the collimator unit 6.

The optical scanning unit 7 is constructed of, for example, two closely positioned galvanometer mirrors (not shown) which are supported so as to be capable of rocking about two mutually orthogonal axes, that is, so-called proximity galvanometer mirrors. The galvanometer mirrors are rocked back and forth at a predetermined speed by actuators (not shown) based on control signals sent from an external control device (not shown) via a cable 12. Thus, the collimated beam is two-dimensionally scanned.

A barrel 8*b* for supporting lenses 8*a* of the pupil projection lens unit 8 is fixed to a barrel 9*b* for supporting lenses 9*a* of the imaging lens unit 9, and the barrel 9*b* of the imaging lens unit 9 is fixed in turn to the main body case 5. The barrel 9*b* of the imaging lens unit 9 is provided with a substantially cylindrical fixed cylinder 13.

The objective-lens mounting part 3 is provided with a movable cylinder 14 which is fitted so as to be movable in the optical axis direction outside the fixed cylinder 13. A collar 14*a*, which extends in the outer radial direction, is provided at one end of the movable cylinder 14. A threaded portion 16 for attaching the objective lens 15 is provided at the other end of the movable cylinder 14.

Figure 5:
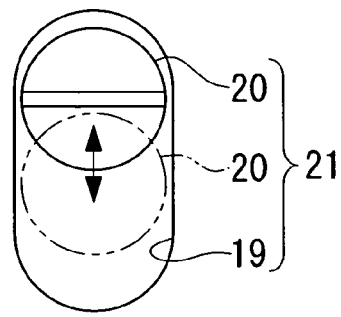
FIG. 5 is a plan view showing a rotation locking mechanism of the microscope apparatus in FIG. 1.

A holder 17 engaging with the collar 14a of the objective-lens mounting part 3 is fixed to the barrel 9b of the imaging lens unit 9. A threaded hole 18 is formed in the radial direction in the outer surface of the fixed cylinder 13. An elongated hole 19 that extends over a/predetermined length in the axial direction is formed in the movable cylinder 14 at a position corresponding to the threaded hole 18. A bolt 20 is screwed into the threaded hole 18 via the elongated hole 19. The elongated hole 19 has a width that is slightly larger than the diameter of the head of the bolt 20. Therefore, as shown in FIG. 5, the head of the bolt 20 can move in the axial direction in the elongated hole 19 (as indicated by the arrow between the solid line and the broken line), but relative motion of the elongated hole 19 and the bolt 20 in the circumferential direction is prevented. Therefore, the elongated hole 19 and the bolt 20 constitute a rotation locking mechanism 21.

In FIG. 1, reference numeral 22 represents a cover member for covering the head of the bolt 20 and the elongated hole 19. The cover member 22 is formed of rubber, for example, and by gripping it when attaching the objective lens unit 15, the objective-lens mounting part 3 to which the objective lens unit 15 is attached can be held so that it does not slide, thus facilitating attachment of the objective lens unit 15. The cover member 22 completely covers the elongated hole 19 provided in the movable cylinder 14 and prevents dust from getting into the elongated hole 19. Furthermore, by covering the elongated hole 19 and the bolt 20, the external appearance is improved.

Stepped portions 13a and 14b, which are disposed to oppose each other in the longitudinal direction, are respectively formed on the outer surface of the fixed cylinder 13 and on the inner surface of the movable cylinder 14, around the entire circumference thereof. A coil spring (hereinafter referred to as coil spring 4) constituting the urging mechanism 4 mentioned above is sandwiched between these stepped portions 13a and 14b. The coil spring 4 is compressed by a certain amount, even when the distance between the stepped portions 13a and 14b is at its maximum, and constantly provides an urging force in a direction that increases the distance between the stepped portions 13a and 14b.

Figure 2:
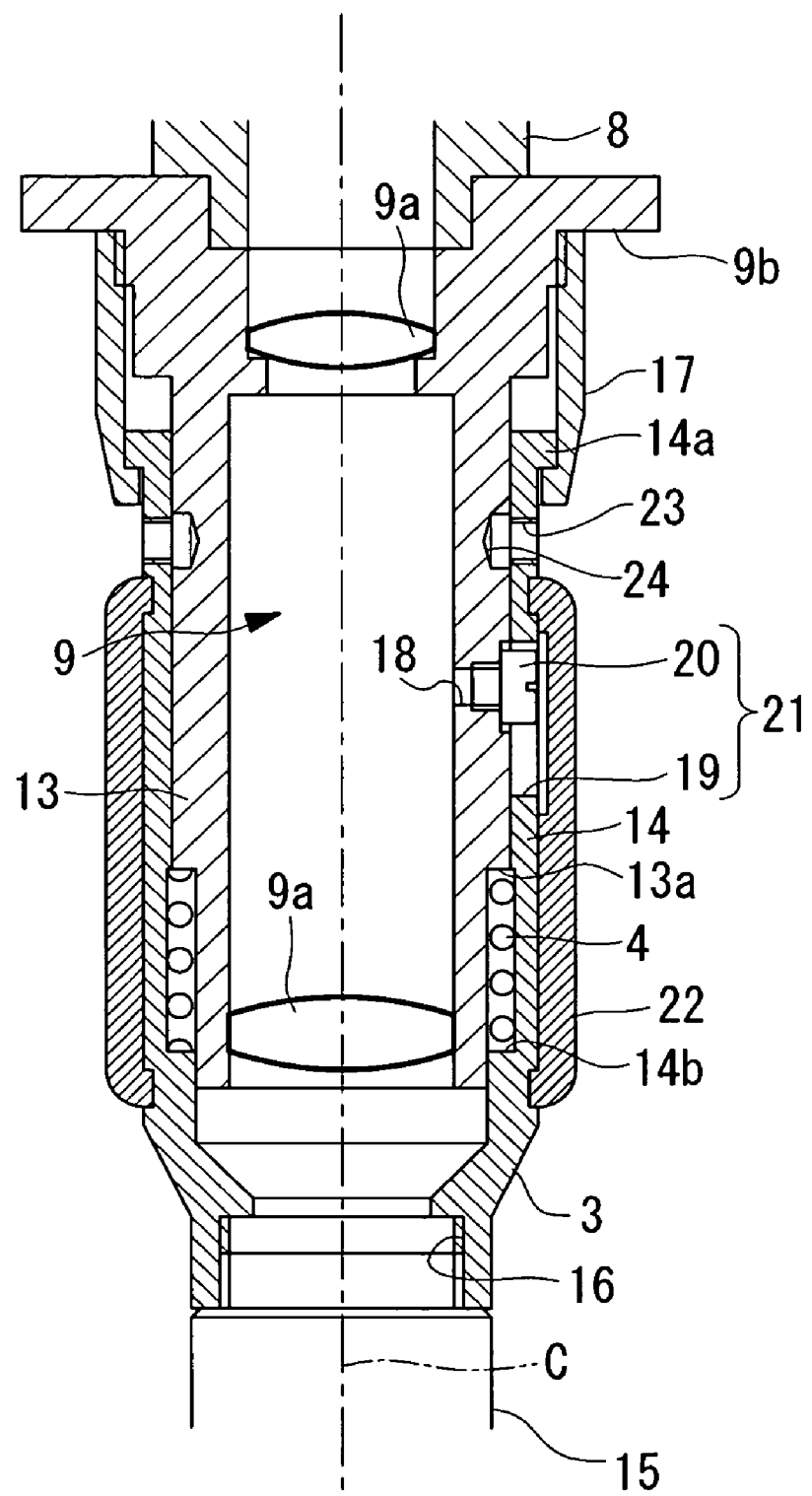
FIG. 2 is a magnified view of part of the microscope apparatus in FIG. 1.

More specifically, as shown in FIG. 2, the objective-lens mounting part 3 is urged towards the distal end (towards the specimen) by the elastic force of the coil spring 4, and the collar 14a provided at the rear end abuts against the holder 17. Thus, only displacement along the optical axis C towards the tip is allowed and precise positioning can be achieved. Also, when a tip 15a of the objective lens unit 15 abuts against a specimen A or another object and is pushed in the direction of the optical axis C and when the pressing force thereof exceeds the elastic force of the coil spring 4, the objective-lens mounting part 3 can move relative to the barrel 9b of the imaging lens unit 9 so that it is pushed backwards towards the rear side along the optical axis C.

In such a case, the relative displacement of the objective-lens mounting part 3 in the optical axis C direction relative to the barrel 9b of the imaging lens unit 9 causes the optical path length at position B of the collimated beam emitted from the imaging lens unit 9 to change.

Figure 6:
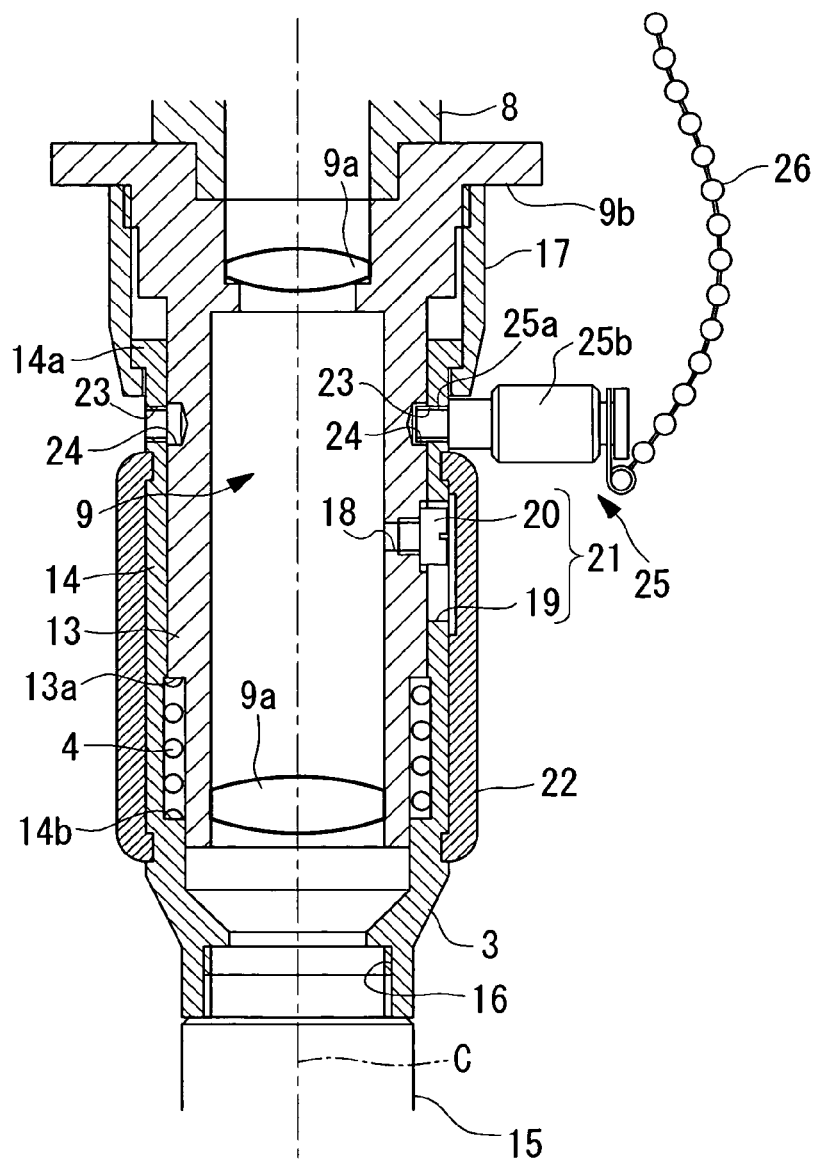
FIG. 6 is a magnified view of part of the microscope apparatus in FIG. 1, showing a locking member.

As shown in FIG. 6, the microscope apparatus 1 according to the present embodiment has a female threaded hole 23 formed to pass through the moving cylinder 14 in the radial direction, and a concave portion 24 is formed in the fixed cylinder 13 so as to be aligned with the female threaded hole 23 when the objective-lens mounting part 3 is at the furthermost forward position. Thus, when the female threaded hole 23 and the concave portion 24 are aligned, an external locking member 25 can be screwed into the female threaded hole 23 to locate the tip ther/eof inside the concave portion 24. As shown in FIG. 6, the locking member 25 has a male screw 25a at the end for engaging with the female threaded hole 23 and a finger grip 25b for gripping when screwing in the male screw 25a. The locking member 25 is attached to the main body case 5 by a chain 26 or the like.

As shown in FIG. 6, by engaging the male screw 25a of the locking member 25 with the female threaded hole 23 in the movable cylinder 14 to position the tip of the fixing member 25 in the concave portion 24 in the fixed cylinder 13, the objective lens unit 15 can be prevented from moving relative to the apparatus main body 2. In other words, even when the objective lens unit 15 is pushed with sufficient force to compress the coil spring 4, since the tip of the fixing member 25 engages with the inside surface of the concave portion 24 in the optical axis C direction, relative motion of the objective lens unit 15 with respect to the apparatus main body 2 is prevented. A through-hole may be provided in the movable cylinder 14 for engaging the male screw 25a of the locking member 25 with the female threaded hole 23 formed in the fixed cylinder 13.

The operation of the microscope apparatus 1 according to the present embodiment, configured in this way, will be described below.

When using the microscope apparatus 1 according to the present embodiment, first, an arm (not shown) that supports the apparatus main body 2 is operated to set the apparatus main body 2 at a desired position and orientation. Then, an incision is made in the specimen A, which is a living organism such as a laboratory animal, and the tip 15a of the objective lens unit 15 is inserted into the opening. Then, the apparatus main body 2 is fixed at a desired position, excitation light, for example, laser light, is supplied from a light source (not shown), and the optical scanning unit 7 is operated.

After being transmitted through the optical fiber 10, the excitation light emitted from the light source is guided into the apparatus main body 2 via the connector 11. Since the collimator unit 6 is provided in the apparatus main body 2, the excitation light emitted into the main body case 5 from the light exit surface 10a of the optical fiber 10 is converted to a collimated beam upon passing through the lenses 6a in the collimator unit 6.

The collimated excitation light is then incident on the optical scanning unit 7. By rocking the galvanometer mirrors in the optical scanning unit 7 back and forth, the excitation light is deflected by 90° (in FIG. 1, horizontally incident excitation light is deflected in the vertical direction) and is two-dimensionally scanned. The scanned excitation light passes through the pupil projection lens unit 8 to form an intermediate image, and thereafter, it passes through the imaging lens unit 9 where it is converted into a collimated beam. Then, the collimated beam emitted from the imaging lens unit 9 enters the objective lens unit 15 and is re-imaged at the focal position at a predetermined working distance in front of the tip 15a.

When the excitation light is incident on the specimen A, fluorescent dye inside the specimen A is excited and generates fluorescence. The fluorescence generated returns inside the objective lens unit 15 via the tip 15a, passes through the imaging lens unit 9, the pupil projection lens unit 8, the optical scanning unit 7, and the collimator unit 6, enters the optical fiber 10, and returns to the light source side. At the light source side, the fluorescence is split off from the excitation light by a dichroic mirror (not shown) and is detected by an optical detector (not shown), for example, a photomultiplier tube (PMT). Then, the detected fluorescence is converted to an image and displayed on a monitor.

When the optical fiber 10 has a core diameter small enough to act as a single mode fiber, a conjugate positional relationship is established between the tip of the optical fiber 10 and the image position to the tip 15a side of the objective lens unit 15, thus forming a confocal optical system. Therefore, only fluorescence generated in the vicinity of the image position to the tip 15a side of the objective lens unit 15 is allowed to enter the optical fiber 10, which allows high-resolution images to be obtained. Also, when the optical fiber 10 has a core diameter larger than that mentioned above, although the resolution is reduced, it is still possible to obtain bright images deep inside the specimen A.

If the apparatus main body 2 and the objective lens unit 15 are moved in the direction of the optical axis C to locate the desired examination position while looking at the images obtained, the image position of the excitation light moves in the optical axis C direction, and as a result, the examination position can be shifted in that direction.

In such a case, when the tip 15a of the objective lens unit 15 abuts against an object, such as comparatively hard tissue inside the specimen A, a pressing force is exerted on the tip 15a of the objective lens unit 15.

Figure 3:
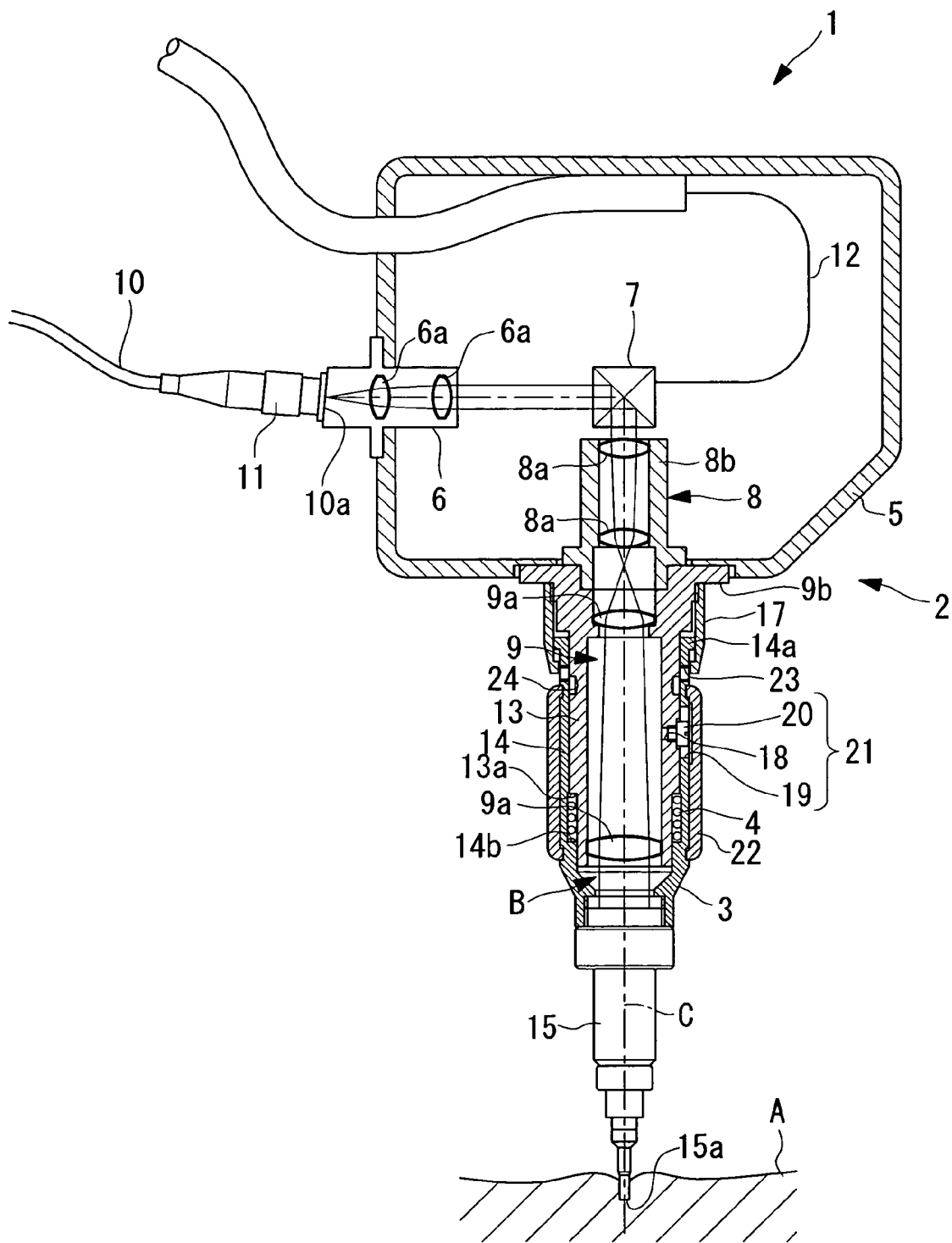
Figure 4:
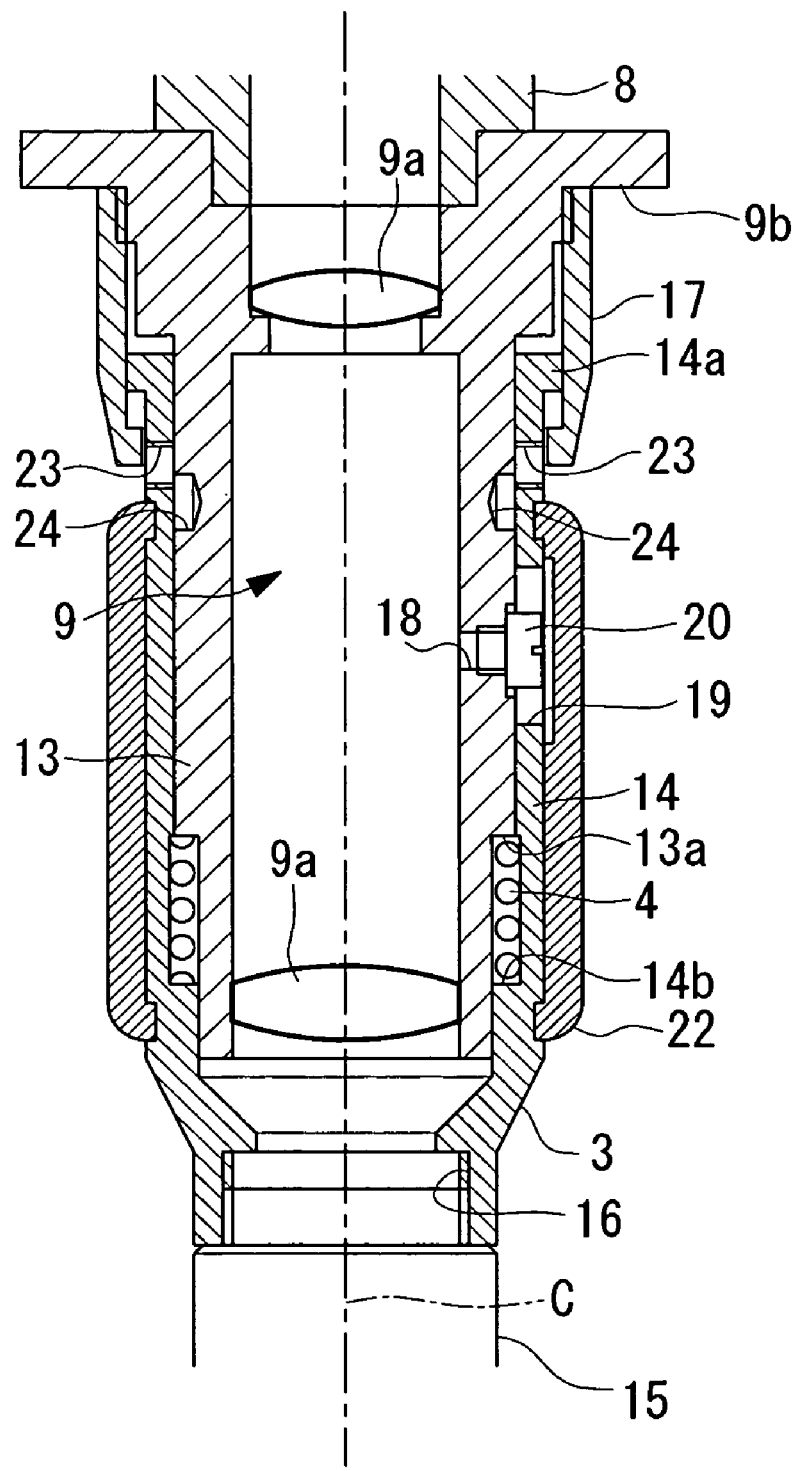
FIG. 4 is a magnified view of part of the microscope apparatus shown in FIG. 3.

If the pressing force-exceeds the elastic force of the coil spring 4, as shown in FIGS. 3 and 4, the coil spring 4 is deformed in the compressive direction, and the objective lens unit 15 and the objective-lens mounting part 3 are relatively displaced in the optical axis C direction with respect to the apparatus main body 2. Therefore, an excessive pressing force can be prevented from being exerted on the tip 15a of the objective lens unit 15, which prevents damage to the objective lens unit 15 as well as to the specimen A.

In this case, with the microscope apparatus 1 according to the present embodiment, since a shock-absorbing mechanism, including the coil spring 4 described above, is provided in the apparatus main body 2 rather than near the tip 15a of the objective lens unit 15, the construction near the tip 15a of the objective lens unit 15 can be simplified, which allows the diameter to be reduced. Therefore, when carrying out examination inside a specimen A such as a living organism, the incision made in the specimen A for inserting the tip 15a of the objective lens unit 15 can be reduced to the minimum necessary size.

As a result, the stress placed on the specimen A is reduced and the viability of the specimen A can be maintained over an extended period of time. That is, while the tip 15a of the objective lens unit 15 is inserted into the specimen A, such as a living organism, it is possible to carry out in-vivo examination over an extended period of time.

Furthermore, with the microscope apparatus 1 according to the present embodiment, having no shock-absorbing mechanism in the objective lens unit 15, when replacing the objective lens unit 15 on the objective-lens mounting part 3 with another one having a different magnification or tip shape, since there is no need to provide a shock-absorbing mechanism in each objective lens unit 15, an advantage is provided in that the overall cost of the apparatus can be reduced. Also, since no moving parts for the shock-absorbing mechanism are provided in the objective lens unit 15, the construction of the objective lens unit 15 can easily be made waterproof. Therefore, it is possible to provide a microscope apparatus 1 that is suitable for carrying out examination when the tip 15a of the objective lens unit 15 is inserted inside a specimen A that includes fluid.

Moreover, with the microscope apparatus according to the present embodiment, when displacing the objective lens unit 15 relative to the apparatus main body 2, the optical path length at position B of the collimated beam emitted from the imaging lens unit 9 changes. Therefore, even though the objective lens unit 15 is displaced in the direction of the optical axis C, the imaging relationship thereof does not change.

In other words, when the tip 15a of the objective lens unit 15 presses against the specimen A, even though the objective lens unit 15 is pushed back in the direction of the optical axis C by that pressing force, the image displayed on the monitor does not go out of focus. Therefore, by ensuring sufficient relative displacement between the objective lens unit 15 and the apparatus main body 2, it is possible to carry out examination of the same position while displacing the objective lens unit 15 with respect to the apparatus main body 2.

For example, when the specimen A is a living organism such as a mouse, while performing in-vivo examination, the surface of the specimen A moves due to beating of the heart, pulsing of the blood vessels, respiration and so forth. In such a case, using the microscope apparatus 1 according to the present embodiment, the tip 15a of the objective lens unit 15 presses against the specimen A and examination is carried out while the objective lens unit 15 is pushed back slightly towards the apparatus main body 2.

By doing so, the specimen A is pressed by the pressing force of the objective lens unit 15, and in the event of pulsing or the like as described above, examination can be carried out while the objective lens unit 15 shifts to follow the pulsing or the like. In such a case, since the imaging relationship does not change even though the objective lens unit 15 moves, it is possible to continuously display clear, in-focus images.

Figure 8:
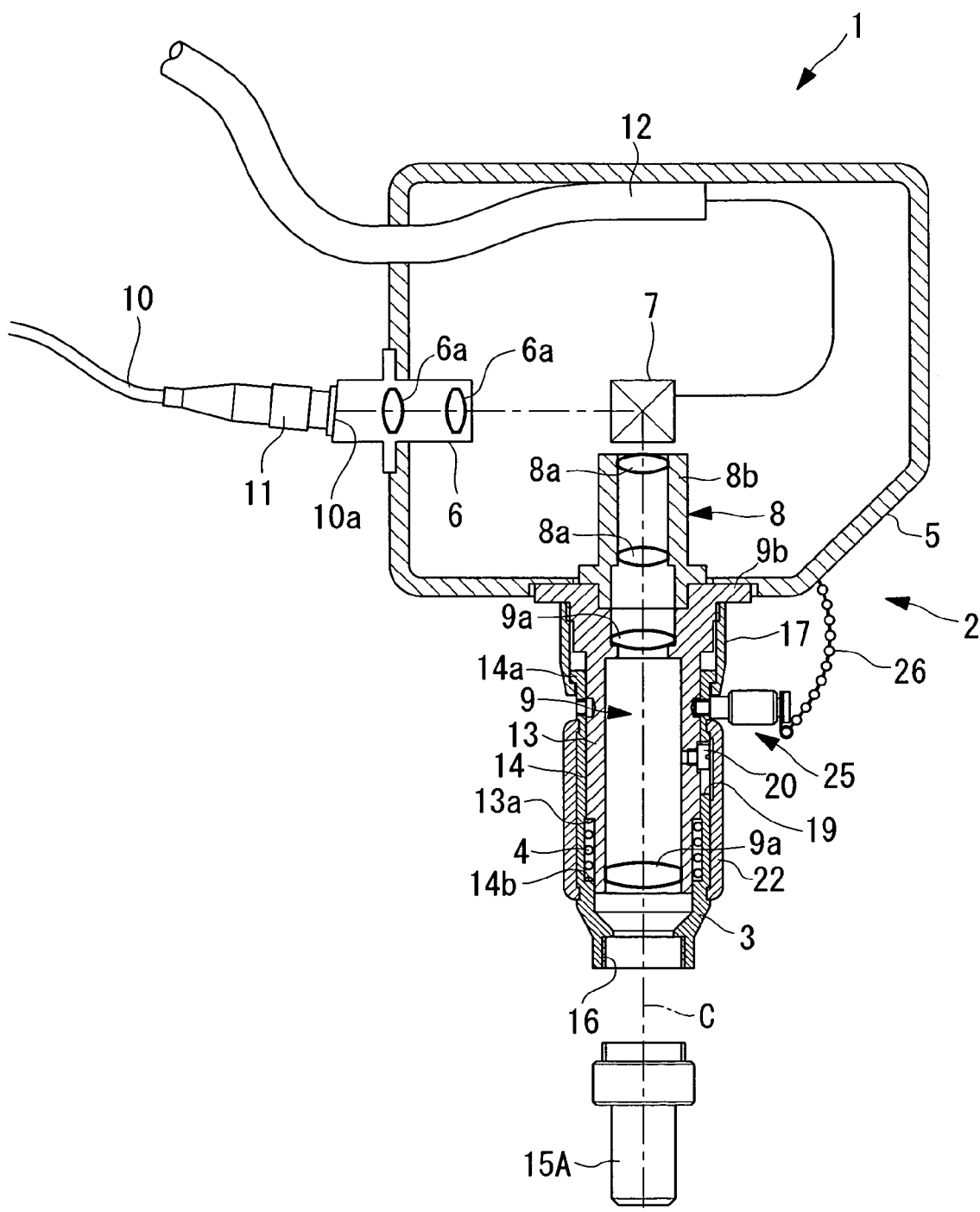
FIG. 8 is a longitudinal section view showing a standard microscope objective lens unit being attached to the microscope apparatus in FIG. 1.

Furthermore, with the microscope apparatus 1 according to the present embodiment, since the objective lens unit 15 is attached at the position B of the collimated beam emitted from the imaging lens unit 9, the objective lens unit 15 is an infinity optical system. Therefore, by designing the threaded portion 16 of the objective-lens mounting part 3 to have a standard thread normally used in microscopes, it is also possible to attach a standard microscope objective lens unit 15A, as shown in FIG. 8.

Furthermore, with the microscope apparatus according to the present embodiment, as shown in FIG. 5, the head of the bolt 20 attached to the fixed cylinder 13 is provided inside the elongated hole 19 formed in the movable cylinder 14 to prevent rotation of the objective-lens mounting part 3 in the circumferential direction relative to the apparatus main body 2. Therefore, it is possible to prevent the optical characteristics of the overall apparatus from changing due to the objective lens unit 15 becoming rotated with respect to the imaging lens unit 9. Also, since the objective-lens mounting part 3 is prevented from rotating when the objective lens unit 15 is attached to the threaded portion 16 provided on the objective-lens mounting part 3, an advantage is provided in that attachment of the objective lens unit 15 is facilitated.

In the microscope apparatus 1 according to the present embodiment, by engaging the male screw 25a of the locking mechanism 25 with the female threaded hole 23 provided in the movable cylinder 14, it is possible to fix the objective lens unit 15 so that it does not shift relative to the apparatus main body 2 in the direction of the optical axis C.

With this configuration, since the objective lens unit 15 is not shifted relative to the apparatus main body 2 even when pushed with a relatively large force, the shock-absorbing mechanism does not operate. This is convenient in applications where it is preferable not to operate the shock-absorbing mechanism.

For example, this is the case when the microscope apparatus 1 according to the present embodiment is employed as a sclerotic endoscope. If the object under examination, which abuts against the tip 15a of the objective lens unit 15, is not hard and there is no risk of damaging the objective lens unit 15, even though it may be pressed strongly, when it is desired to advance the objective lens unit 15 further, it is more useful not to operate the shock-absorbing mechanism.

Figure 7:
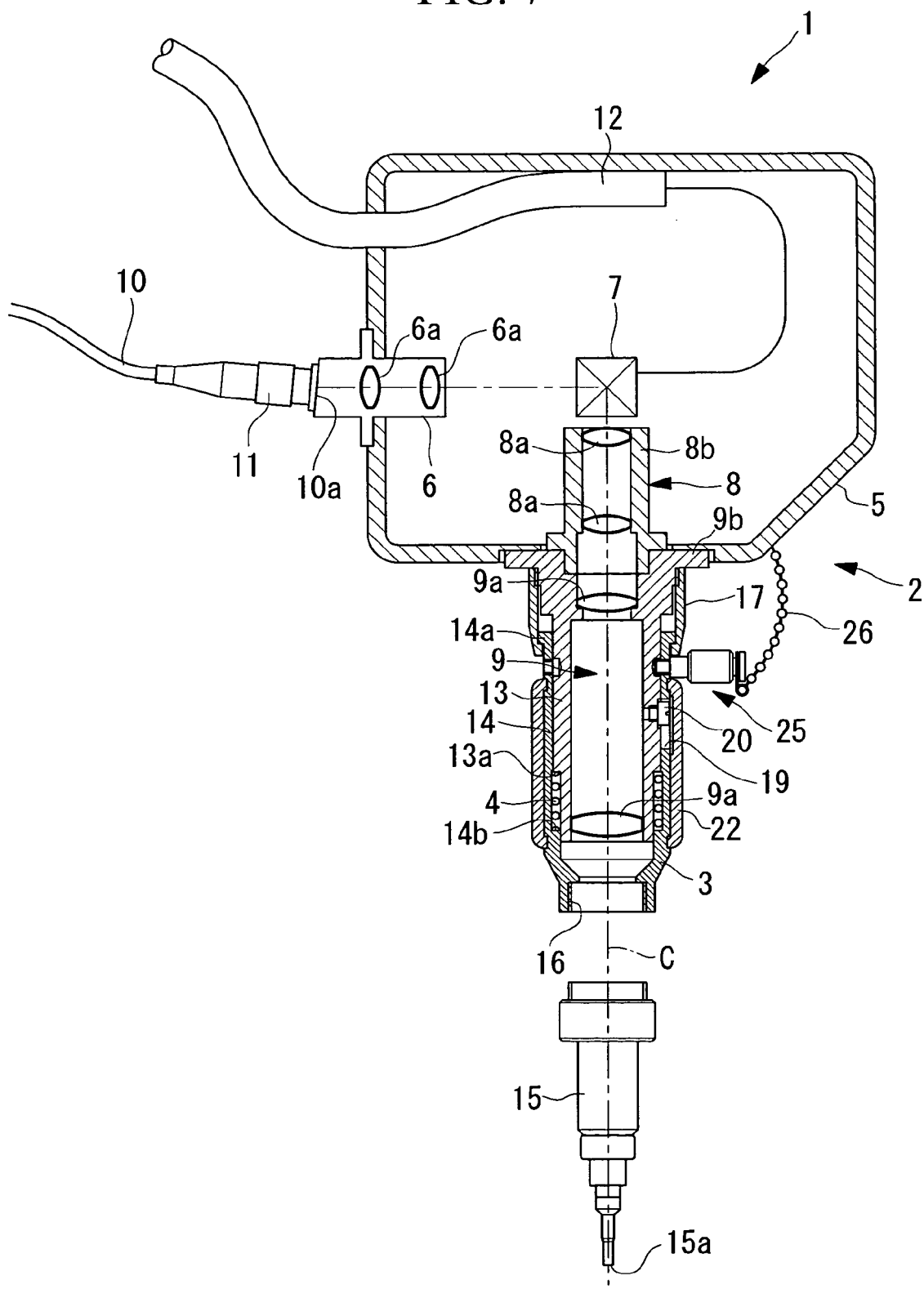
FIG. 7 is a longitudinal sectional view showing a small-diameter objective lens unit being attached to the microscope apparatus in FIG. 1.

As shown in FIGS. 7 and 8, when attaching objective lens units 15 and 15A to the objective-lens mounting part 3, particularly when actually screwing in the objective lens units 15 and 15A, the operation of the shock-absorbing mechanism (coil spring 4) is stopped to fix the objective-lens mounting part 3, which allows the objective lens units 15 and 15A to be screwed in more easily and efficiently.

Figure 9:
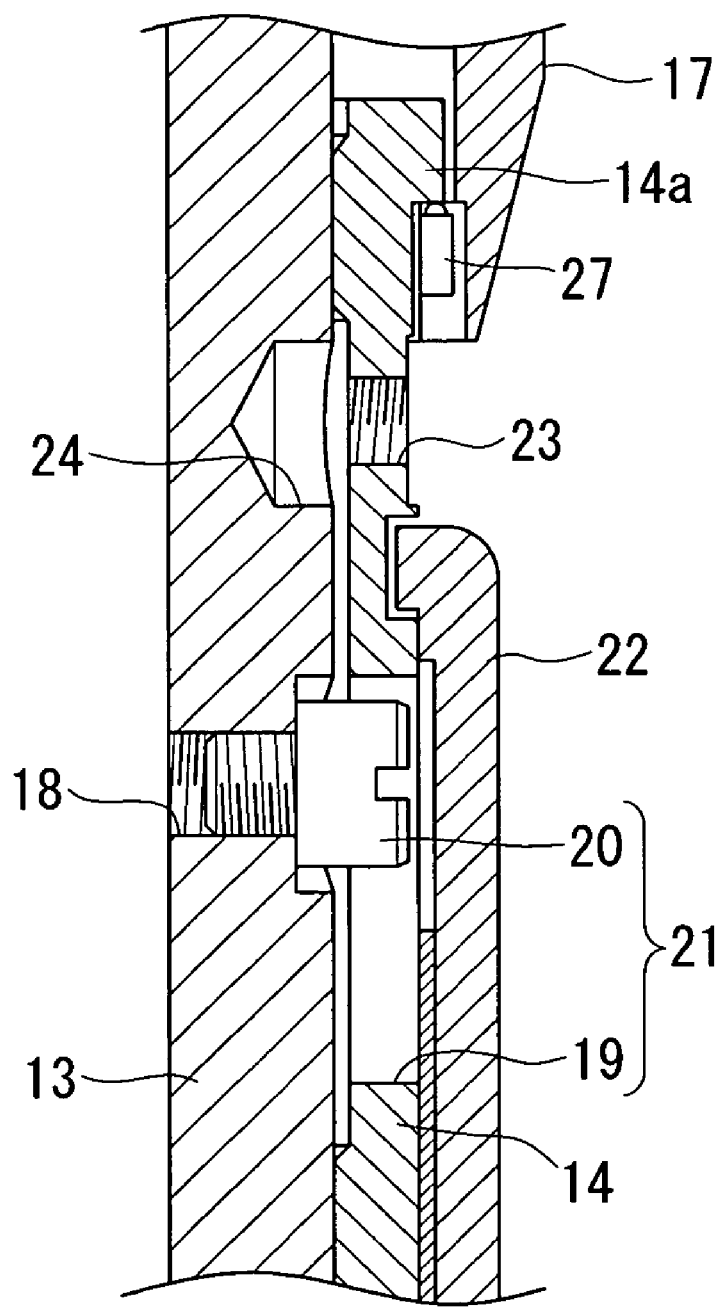
FIG. 9 is a partial magnified longitudinal sectional view showing a modification of the microscope apparatus according to the present invention.

In the present invention, as shown in FIG. 9, a microswitch 27 may be provided at the position where the holder 17 fixed to the barrel 9b of the imaging lens unit 9 and the collar 14a of the movable cylinder 14 abut. In the example shown in FIG. 9, the microswitch 27 is designed so that it is turned on when the holder 17 and the collar 14a abut, and it is turned off when the objective lens unit 15 is pushed back so that the holder 17 and the collar 14a disengage.

With this configuration, when pressure is applied to the tip 15a of the objective lens 15 and the coil spring 4 is compressed, since the collar 14a of the movable cylinder 14 and the holder 17 disengage, the microswitch 27 changes from the on state to the off state. As a result, it is possible to detect that some pressure is applied to the tip 15a of the objective lens unit 15. The output from the microswitch 27 may trigger an indicator, for example a monitor screen, turning a lamp on or off, or issuing a sound.

By increasing the stroke of the microswitch 27, it is possible to detect when the objective lens unit 15 has shifted by a predetermined amount with respect to the apparatus main body 2. Also, it is possible to constantly detect the position of the objective lens unit 15 with a linear scale and to display the result on a monitor or the like when the position has exceeded a predetermined distance. With these configurations, it is possible to carry out examination while the position of the objective lens unit 15 with respect to the apparatus main body 2 is within a certain acceptable range in order to suppress pulsing, as described above.

Figure 10:
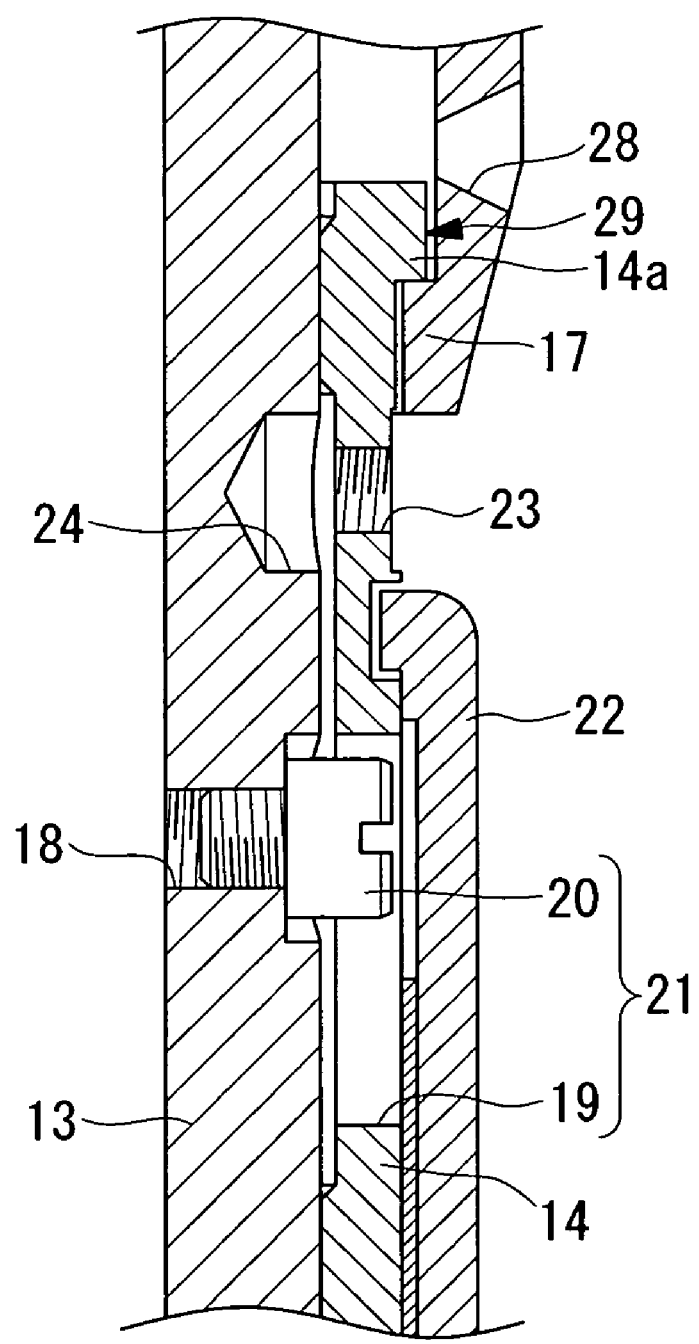
FIG. 10 is a partial magnified longitudinal section view showing another modification of the microscope apparatus according to the present invention.

As shown in FIG. 10, an indicator window 28 may be formed in the radial direction through the holder (first cylinder) 17, which is fixed to the barrel 9b of the imaging lens unit 9, and a relative displacement indicator of a highly visible color, such as red or a fluorescent color, may be provided on the outer surface of the collar 14a of the movable cylinder (second cylinder) 14.

In the configuration shown in FIG. 10, since the collar 14a is engaged with the holder 17, no pressing force is exerted on the tip 15a of the objective lens unit 15, and therefore, the relative displacement indicator 29 is hidden so as not to be visible through the indicator window 28. Conversely, when a pressing force is exerted on the tip 15a of the objective lens unit 15 and the coil spring 4 is compressed, the relative displacement indicator 29 provided on the outer surface of the collar 14a is exposed through the indicator window 28 and can be seen from the outside.

Therefore, by determining whether or not the relative displacement indicator 29 appears in the indicator window 28, even when the tip 15a of the objective lens unit 15 is completely buried inside the specimen and cannot be seen, it is possible to determine whether or not the tip 15a of the objective lens unit 15 is being pushed. The indicator window 28 may be provided in the cylinder disposed at the outer side and the relative displacement indicator 29 may be provided on the cylinder disposed at the inner side, depending on the positional relationship between the holder 17 and the movable cylinder 14. Also, the indicator window 28 may be provided in the movable cylinder 14 and the relative displacement indicator 29 may be provided on the fixed cylinder 13.

The present invention described above includes an imaging lens, provided in the objective-lens mounting part in the apparatus main body, for collimating light from a light source.

With this configuration, the objective lens unit can be attached to the apparatus main body at a position where the light from the light source is converted to a collimated beam by the imaging lens. Therefore, it is possible to attach a standard objective lens unit having an infinity optical system. Also, since the distance along the optical axis between the objective lens unit and the imaging lens in the apparatus main body changes at the region where the beam is collimated, an advantage is provided in that there is no effect on the imaging relationship. In other words, even though the objective lens unit moves in the optical axis direction relative to the apparatus main body because it is in contact with the specimen, it is possible to continuously acquire clear, in-focus images of the interior of the specimen.

Furthermore, the invention described above includes a rotation locking mechanism for preventing relative rotation between the apparatus main body and the objective-lens mounting part in a circumferential direction.

Since relative rotation in the circumferential direction between the apparatus main body and the objective lens unit is prevented by operating the rotation locking mechanism, changes in the optical characteristics of the overall apparatus due to relative rotation of the optical components can be prevented. Also, when the attaching mechanism of the objective-lens mounting part is a threaded portion, preventing relative rotation between the objective-lens mounting part and the apparatus main body can facilitate screwing of the objective lens unit into the objective-lens mounting part.

Furthermore, the invention described above includes a locking member that is removably fixed to one of the apparatus main body and the objective-lens mounting part, wherein, when fixed to one of the apparatus main body and the objective-lens mounting part, the locking member abuts against the other one of the apparatus main body and the objective-lens mounting part to prevent relative displacement of the objective-lens mounting part with respect to the apparatus main body in the optical axis direction.

Fixing the locking member to the apparatus main body or the objective-lens mounting part fixes the objective-lens mounting part relative to the apparatus main body so that it does not move in the optical axis direction. Therefore, the task of attaching the objective lens unit to the objective-lens mounting part can be simplified. Also, the microscope apparatus can be used in applications where the objective lens unit should be continuously inserted against a force, for example, in endoscopic applications, even though a relatively large external force is exerted on the tip of the objective lens unit by the specimen.

Furthermore, the invention described above includes a sensor for detecting relative displacement of the objective-lens mounting part with respect to the apparatus main body in the optical axis direction.

Even when the tip of the objective lens unit attached to the objective-lens mounting part is inserted inside the specimen and cannot be seen from outside, the sensor detects the relative displacement of the objective-lens mounting unit in the optical axis direction with respect to the apparatus main body, which allows confirmation of the fact that the tip of the objective lens unit is pressing against the specimen or the like.

In the invention described above, the sensor preferably detects relative displacement at or above a predetermined value.

With this configuration, even though the tip of the objective lens unit attached to the objective-lens mounting part is pressed by the specimen, this fact is not detected, and relative displacement is permitted so long as it is within a predetermined range. Therefore, it is possible to continue examining the specimen while it is being pressed by the tip of the objective lens unit due to the urging force of the urging member. For example, when the specimen pulsates, the objective lens unit complies with this pulsation, and therefore, examination can be carried out to acquire clear, blur-free images. Then, by detecting when a relative displacement above a predetermined amount occurs between the apparatus main body and the objective-lens mounting part, it is possible to ensure that no damage is caused to the objective lens unit or the specimen.

In the invention described above, the apparatus main body may include a first cylinder disposed along the optical axis; the objective-lens mounting part may include a second cylinder that engages with the first cylinder so as to be capable of moving in the optical axis direction; and, of the first cylinder and the second cylinder, the cylinder disposed at the inside may be provided with a relative displacement indicator which is exposed from below the cylinder provided at the outside when relative displacement of these cylinders occurs in the optical axis direction.

With this configuration, when the tip of the objective lens unit attached to the objective-lens mounting part is pressed by the specimen, a relative displacement in the optical axis direction occurs between the apparatus main body and the objective-lens mounting part, whereupon the relative displacement indicated provided on the first cylinder or the second cylinder, whichever one is disposed at the inner side, is exposed from below the cylinder disposed at the outer side. Accordingly, it is possible to indicate the relative displacement. In other words, by checking the exposed relative displacement indicator, the operator of the microscope examination system can confirm that the tip of the objective lens unit is in contact with the specimen and has been pushed back. By operating the apparatus accordingly after taking this into account, it is possible to prevent damage to the objective lens unit or the specimen.

What is claimed is:

1. A microscope apparatus comprising:
   an objective lens unit;
   an imaging lens for collimating light from a light source and emitting a collimated beam toward the objective lens unit;
   an apparatus main body having a fixed cylinder for supporting the imaging lens;
   an objective-lens mounting part for detachably mounting the objective lens unit, the objective-lens mounting part having a movable cylinder which is fitted outside the fixed cylinder so that the movable cylinder is movable in an optical axis direction; and
   an urging mechanism, provided between the fixed cylinder and the movable cylinder, for urging the objective-lens mounting part towards a tip of the objective lens unit relative to the apparatus main body.

2. The microscope apparatus according to claim 1, further comprising:
   a rotation locking mechanism for preventing relative rotation between the apparatus main body and the objective-lens mounting part in a circumferential direction.

3. The microscope apparatus according to claim 1, further comprising:
   a locking member that is removably fixed to one of the apparatus main body and the objective-lens mounting part,
   wherein, when fixed to one of the apparatus main body and the objective-lens mounting part, the locking member abuts against the other one of the apparatus main body and the objective-lens mounting part to prevent relative displacement of the objective-lens mounting part with respect to the apparatus main body in the optical axis direction.

4. The microscope apparatus according to claim 1, further comprising:
   a sensor for detecting relative displacement of the objective-lens mounting part with respect to the apparatus main body in the optical axis direction.

5. The microscope apparatus according to claim 4, wherein the sensor detects relative displacement at or above a predetermined value.

6. The microscope apparatus according to claim 1, further comprising:
   a relative displacement indicator, wherein the relative displacement indicator is hidden when no pressing force is exerted on the tip of the objective lens unit, and wherein the relative displacement indicator is exposed when a pressing force is exerted on the tip of the objective lens unit.

7. The microscope apparatus according to claim 1, wherein an optical axis of the objective lens unit and an optical axis of the imaging lens are aligned with each other when the objective lens unit is mounted to the objective-lens mounting part.

* * * * *